Sept. 11, 1951  E. A. WATSON ET AL  2,567,500
LIQUID FUEL CONTROL MEANS

Filed Nov. 21, 1945  2 Sheets-Sheet 1

Inventors
E. A. Watson
R. J. Ifield
By Hoover & Downing Newell Attys

Patented Sept. 11, 1951

2,567,500

UNITED STATES PATENT OFFICE 2,567,500

LIQUID FUEL CONTROL MEANS

Ernest Ansley Watson and Richard Joseph Ifield, Birmingham, England, assignors to Joseph Lucas Limited, Birmingham, England Application November 21, 1945, Serial No. 629,926
In Great Britain September 4, 1944

3 Claims. (Cl. 137—144)

This invention relates to means for controlling the supply of liquid fuel to an internal combustion prime mover from a variable-delivery pump, and has for its object to provide improved means for enabling the control to be effected manually or in response to variations of atmospheric pressure.

In the accompanying sheets of explanatory drawings—

Figure 3:
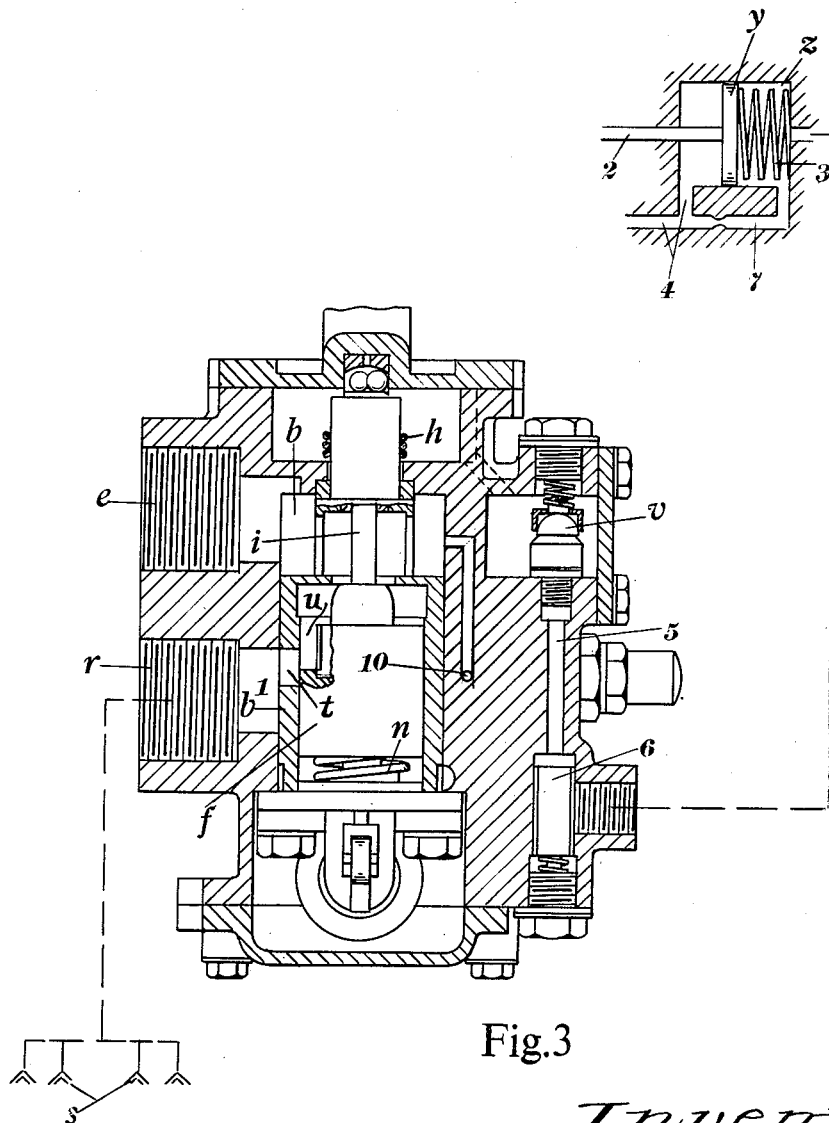
Figure 3 is a section on the line 3—3 of Figure 1.

In carrying the invention into effect as shown, we employ a body $a$ of any convenient construction adapted to provide three main chambers $b$, $c$, $d$. The chamber $b$ is of cylindrical form, and communicates at one end with an inlet passage $e$ (Figure 3) to which liquid fuel can be supplied by a variable delivery pump (not shown). Within a fixed liner $b^1$ in the cylindrical chamber $b$ is arranged a spring-loaded piston valve $f$ which is both rotatable and axially slidable in the chamber. Rotary movement is imparted to the piston valve $f$ in one direction by a manually operable or other lever $g$, and in the opposite direction by a torsion spring $h$, the lever and spring being arranged to act on the valve through the medium of a rotatable stem $i$ having a slidable but non-rotatable connection with the valve. An adjustable connection is preferably provided between the lever $g$ and the valve $f$ to enable the movement-ratio of the lever and valve to be varied to suit different conditions. Thus, in the example shown, a cam $j$ on a spindle $k$ connected to the lever $g$ co-operates with a lever arm $m$ on the stem $i$ to transmit motion from the lever to the valve $f$. To effect change of ratio the cam $j$ is replaced by another of appropriately different form. Alternatively, or in addition, the valve $f$ may be rotatable by any other means appropriate to a particular requirement. Axial movement is automatically imparted to the valve $f$ in one direction by fluid pressure as hereinafter described, and in the opposite direction by a compression spring $n$ acting on the valve.

Figure 1:
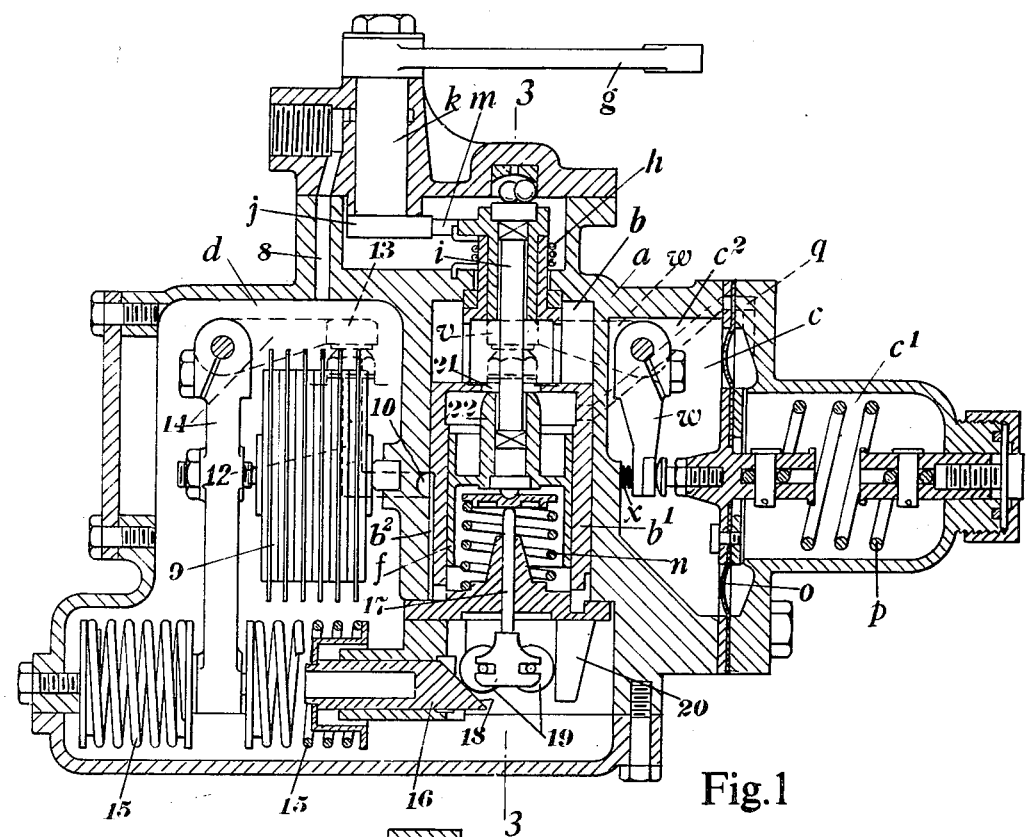
Figure 1 is a sectional side view of means constructed in accordance with the invention.
Figure 2:
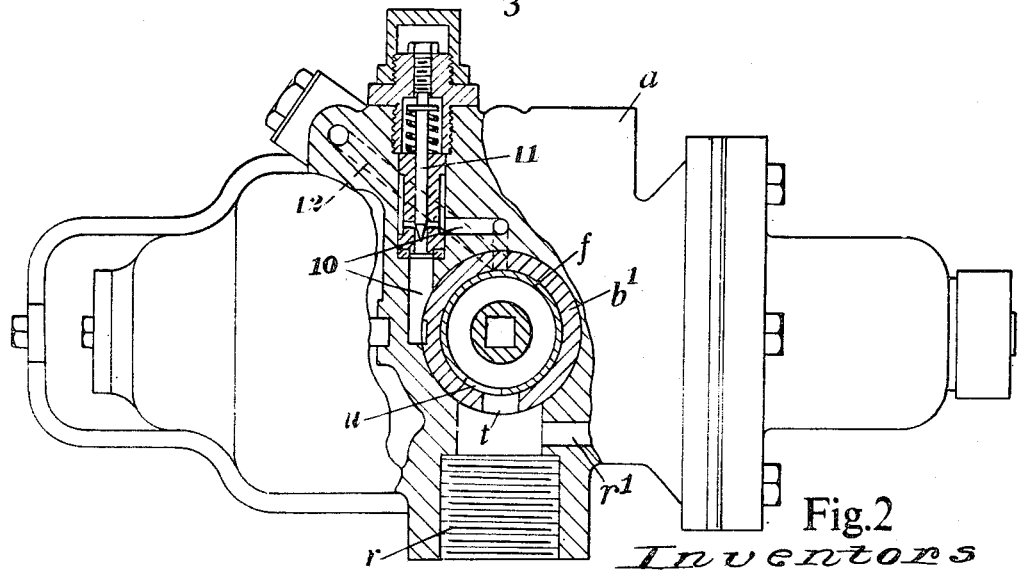
Figure 2 is a part sectional side view taken at right angles to Figure 1.

The chamber $c$ is situated adjacent to the cylindrical chamber $b$ and is divided into two compartments $c^1$, $c^2$ by a flexible diaphragm $o$, the latter being loaded by an adjustable tension spring $p$. The compartment $c^1$ at one side of the diaphragm $o$ communicates through passages $q$ and the cylindrical chamber $b$ with the liquid fuel inlet passage $e$, and the compartment $c^2$ at the other side of the diaphragm communicates through a passage $r^1$ (Figure 2) with an outlet passage $r$ through which liquid fuel can flow to the jets $s$ (indicated diagrammatically in Figure 3) of an internal combustion prime mover. The compartment $c^2$ and the outlet passage $r$ also communicate through a port $t$ in the liner $b^1$ with the part of the cylindrical chamber $b$ communicating with the inlet passage $e$, this port being controlled by a notch $u$ in the skirt of the piston valve $f$ so that the effective area of the port is variable by either rotary or axial movements of the valve. The diaphragm $o$ is therefore subject to the difference between the pressures of the liquid fuel at the inlet and outlet sides of the valve, and the deflexion of the diaphragm in response to this difference of pressure is utilised to actuate a release valve $v$ through the medium of a lever or levers $w$ loaded by a spring $x$. The release valve $v$ controls a fluid operated device of known form for varying the output of the pump above mentioned, and the arrangement is such that when the release valve is closed the pump gives maximum delivery, reduction of the pump delivery being effected by appropriate opening movement of the release valve. The fluid operated device is shown diagrammatically in Figure 3, and comprises a piston $y$ slidable in a cylinder $z$ and connected by a rod 2 to a swash plate or other output controlling member of the pump. The piston $y$ is loaded by a spring 3 which tends to move the piston in the direction for increasing the pump output, this movement of the piston being opposed by the pressure of liquid fuel supplied by the pump to one end of the cylinder $z$ through an unrestricted passage or passages 4. Also the other end of the cylinder $z$ communicates with a discharge passage 5 containing a filter 6 and controlled by the release valve $v$. Moreover, the two ends of the cylinder $z$ are interconnected by a restricted passage 7. The function of the fluid operated device above described is well known and does not require description. It is sufficient to say that the piston $y$ moves under fluid pressure in the direction for reducing the pump output when the release valve $v$ is opened, and in the opposite direction when the release valve is closed. It will be understood that when the fuel supply to the prime mover jets $s$ is restricted by movement of the piston valve $f$, the difference of pressure acting on the diaphragm $o$ is correspondingly increased, and this causes the output controlling member of the pump to be actuated for effecting corresponding reduction of the pump output.

The third chamber $d$ is open to the atmosphere through a passage 8, and in this chamber is arranged a barometric device 9 in the form of a series of flexible capsules responsive to atmospheric pressure. The barometric device 9 is required to effect axial adjustment of the piston valve $f$ in response to variations of atmospheric pressure. For this purpose in the example shown, the two ends of the cylindrical chamber $b$ are interconnected by a narrow passageway 10 which is provided with an adjustable flow-restricting member 11, and which serves to conduct liquid fuel from the part of the cylindrical chamber at the inlet side of the piston valve $f$ to a longitudinal groove $b^2$ in the liner $b^1$, this groove being in communication with the part of the chamber at the other side of the piston valve. Also the restricted passageway 10, and consequently the end of the cylindrical chamber $b$ to which liquid fuel is admitted through the restricted passageway 10, communicates with a discharge passage 12, the latter being controlled by a second release valve 13 which is responsive to the action of a lever or levers 14 operable by the barometric device 9. The lever or one of the levers 14 is also operable by the piston valve $f$ through one of a pair of opposed springs 15 by which the lever is loaded, and through any convenient mechanism situated between the spring and the piston valve. Preferably and as shown this mechanism comprises a push piece 16 arranged at right angles to the axis of the piston valve $f$, and a slidable stem 17 arranged coaxially with and adapted to act on the piston valve, the push piece being formed with a wedge surface 18 which abuts against one of a pair of rollers 19 on the stem. The other of the rollers 19 abuts against a fixed guide piece 20 at the lower end of the cylindrical chamber $b$. The arrangement is such that when the release valve 13 is closed due to diminution of atmospheric pressure, the piston valve $f$ is subject to equal fluid pressures at its two sides, and the spring $n$ causes the piston valve to move to a position in which the flow of liquid fuel through the port $t$ is correspondingly reduced. With an increase in atmospheric pressure the release valve 13 opens and allows fluid to escape from the cylindrical chamber $b$ at the side of the piston valve $f$ remote from the inlet passage $e$. The piston valve $f$ is thereby caused to move under the action of fluid pressure to a new position to increase the effective area of the port $t$ and permit an appropriately increased supply of fuel to the outlet passage $r$. During this movement the piston valve $f$ also serves by acting on the stem 17 to move the lever or levers 14 through the medium of the push piece 16 in the direction for reclosing the release valve 13.

If desired there may be provided at or near the entrance to the cylindrical chamber $b$ an orifice 21 through which the liquid fuel from the inlet passage $e$ can flow, and the effective area of which is variable by a conical or other closure member 22 formed by an extension of the piston valve $f$, the purpose of this orifice and closure member being to restrict the flow of liquid fuel from the inlet $e$ to the port $t$, and thereby ensure an adequate delivery pressure from the pump when the latter is operating with a restricted output. In the example shown the orifice 21 is formed in a transverse portion of the liner $b^1$. By arranging the passage $q$ to communicate with the inlet $e$ at the piston valve side of the orifice 21, the latter has no effect on the pressure difference acting on the diaphragm $o$, this pressure difference being dependent only on the position of the piston valve $f$.

By this invention the desired control of the liquid flow to the prime mover and of the pump output in response to the driver (or otherwise) and automatically in response to variations of atmospheric pressure is effected in a very convenient and satisfactory manner. The invention is not, however, restricted to the example described as subordinate details may be modified to suit different requirements.

Having thus described our invention what we claim as new and desire to secure by Letters Patent is:

1. Control means comprising in combination, a cylindrical chamber, a pressure liquid inlet passage communicating with said chamber, a pressure liquid outlet passage also communicating with said chamber, a rotatable and axially slidable piston valve arranged in said chamber and shaped to control communication between the inlet and outlet passages, a spring for imparting axial sliding movement to said piston valve in one direction, said piston valve being slidable in the opposite direction by liquid under pressure admitted to said chamber through said inlet passage, a pressure relief valve associated with said chamber for controlling the axial sliding movement of said piston valve, a barometric device for actuating said pressure relief valve, means for independently imparting rotary movement to said piston valve, a second chamber, a spring loaded member dividing said second chamber into two compartments and responsive to fluid pressure, passages through which liquid from said inlet passage has access to one of said compartments and liquid from said outlet passage has access to the other of said compartments so that the opposite sides of said member are exposible to different fluid pressures, and a third valve operable by said member.

2. Control means as claimed in claim 1 and having a lever through which said pressure relief valve is operable by said barometric device, and another lever through which said third valve is operable by said diaphragm.

3. Control means as claimed in claim 1 and having a spring loaded lever through which said pressure relief valve is operable by said barometric device, and means for transmitting movement to said lever from said piston valve.

ERNEST ANSLEY WATSON.
RICHARD JOSEPH IFIELD.

REFERENCES CITED

The following references are of record in the file of this patent:

UNITED STATES PATENTS

| Number | Name | Date |
|---|---|---|
| Re. 21,758 | Foisy | Apr. 1, 1941 |
| 685,510 | Flint | Oct. 29, 1901 |
| 2,129,886 | Syrovy | Sept. 13, 1938 |
| 2,299,234 | Snader et al. | Oct. 20, 1942 |
| 2,403,371 | Ifield et al. | July 2, 1946 |
| 2,422,808 | Stokes | June 24, 1947 |

FOREIGN PATENTS

| Number | Country | Date |
|---|---|---|
| 464,891 | Great Britain | Apr. 27, 1937 |